United States Patent Office 3,733,289
Patented May 15, 1973

3,733,289
FIRE RETARDANT COATING COMPOSITION
Arnold J. Burns, Collinsville, Ill., and Glen F. Snow, St. Ann, and Howard L. Vandersall, St. Louis, Mo., assignors to Monsanto Company, St. Louis, Mo.
No Drawing. Continuation-in-part of application Ser. No. 48,813, June 8, 1970, which is a continuation of application Ser. No. 739,149, June 24, 1968, now abandoned. This application Aug. 24, 1971, Ser. No. 174,514
Int. Cl. C08c 11/70
U.S. Cl. 260—28.5 R   4 Claims

ABSTRACT OF THE DISCLOSURE

An improved fire retardant intumescent coating composition for metallic substrates is disclosed; the composition comprises (a) an organic resin, (b) an organic solvent, (c) a carbonific, (d) an ammonium phosphate, (e) asbestos and (f) diatomaceous earth.

---

This application is a continuation-in-part of Ser. No. 48,813 which is a continuation of Ser. No. 739,149 which is now abandoned.

This invention relates to intumescent coating compositions. More particularly, it relates to intumescent compositions which utilize resins dissolved in organic-solvents which have improved properties which compositions provide a high level of protection to metallic substrates.

There is a need for the protection of metallic structural members from the hazards of fire. In many instances structural members such as steel beams will fail due to the intense heat which can be generated during a fire. The intumescent coating compositions heretofore known are generally unsuitable for the protection of metallic members since the primary use of such coating compositions is for coating cellulosic substrates such as wood, fiberboard and the like. When utilized for the protection of metallic members at the thicknesses generally required for protection, these coating compositions tend to crack and pull away from the metallic surface upon exposure to heat, thus allowing the metal to be exposed to the severe heat. Some of these problems are overcome by employing a coating composition comprising a binder, a carbonific, ammonium phosphates and asbestos fibers as disclosed in copending U.S. patent application Ser. No. 739,148, filed June 24, 1968, now abandoned, which is incorporated herein by reference. In some instances, however, it is desired to obtain extremely high protection ratings, that is, ratings well above a one hour rating. While the coating compositions as disclosed in the beforementioned application are highly effective in giving a high degree of protection, the coating compositions which utilize organic solvent dissolved resins can be surprisingly improved by the practice of this invention. It is believed, therefore, that an improved coating composition utilizing the foregoing resins which will give increased protection for metallic substrates when subjected to intense heat is an advancement in the art.

In accordance with this invention, it has been discovered that certain coating compositions that contain resinous binders dissolved in an organic solvent, a carbonific, an ammonium phosphate, certain types of asbestos and diatomaceous earth having certain physical properties (to be hereinafter defined in detail) have surprisingly high protection ratings. Ratings greatly in excess of one hour are surprisingly achieved when the composition is tested under the conditions of ASTM E-119 at a 3/16 inch thickness. It is believed surprising that this particular composition yields such excellent protective ratings when similar compositions without some of the ingredients or with similar ingredients substituted for those described have ratings considerably below those of the present invention.

The resins used in the new compositions are, in general, used in amounts to provide between about 10% and about 35% by weight based on the total weight of the solids present in the composition.

Organic-solvent dissolved resinous binders which can be used in coating compositions are well known. A wide variety of resinous binders are suitable. The suitable resins can be broadly divided into two classifications; i.e., (1) non-convertible—those which consist of a resinous film former dissolved in a suitable solvent: upon application to a surface the solvent evaporates leaving a film which does not undergo significant change on continued exposure, and (2) convertible: upon application to a surface the solvent evaporates and then the resin hardens primarily through oxidation and polymerization reactions induced by the surrounding air. The non-convertible resins form thermoplastic films which can be re-dissolved in the solvent from which they were formed while convertible resins form thermosetting films which cannot be redissolved in the same solvent. Non-limiting examples of each of these types include: in the non-convertible class—vinyl resins, acrylic ester resins, cellulosic polymers, certain saturated alkyd resins and certain rubber resins. Classes of vinyl resins include vinyl toluene acrylic copolymers; vinyl chloride, vinyl acetate resins, vinyl alcohol acetate resins, vinyl butyral resins, vinyl acetate resins, polyvinyl chlorides and other classes of vinyl resins described in Payne Organic Coating Technology, New York-London-Sydney, John Wiley and Sons, Inc., 1965, vol. II, pages 478–535, which is incorporated herein by reference. Classes of acrylic ester resins include polyacrylates, polymethacrylates, polymethyl methacrylates, copolymers of any of the foregoing and other classes described in the aforementioned Organic Coating Technology, on pages 536–561, which is incorporated herein by reference. Classes of cellulosic polymers include esters of cellulose, i.e., cellulose acetate, nitrocellulose and cellulose acetobutyrate and the ethers of cellulose, i.e., ethyl cellulose and benzyl cellulose. Classes of alkyd resins include the halogenated and non-halogenated saturated oil-modified alkyds. Classes of ruber resins include chlorinated rubber, styrene-butadiene copolymers, and butadieneacrylonitrile copolymers.

Specific vinyl resins include polyvinyl chloride having a specific viscosity of 0.57–63 commercially available from Goodyear Tire and Rubber Co., under the trademark Geon Resin 121; a 62% by weight vinyl chloride, 38% by weight vinyl acetate copolymer having an intrinsic viscosity (cyclohexanone at 20° C.) of 0.28; vinyl acetate resin having an intrinsic viscosity of 0.69; vinyl toluene acrylate copolymer, a 33⅓% solution in xylene having a solution viscosity of 164 (seconds to drain, No. 4 Ford cup) and commercially available under the trademark Pliolite VTAC resin, from Goodyear Tire and Rubber Co.; Pliolite VTAC–L resin; and other specific vinyl resins described in the aforementioned Organic Coating Technology on pages 478–535.

Specific examples of acrylic ester resins include a copolymer of acrylic ester and methacrylic ester, a 45% solution in toluene having a viscosity at 20° C. of 6,000 to 10,000 and commercially available under the trademark Acryloid B-48 or B-48N resin from Rohm and Haas; Acryloid B-72 resin; and other specific acrylic ester resins described in the aforementioned Organic Coating Technology on pages 536–561.

Specific examples of cellulosic polymers include ethyl hydroxyethyl cellulose having a viscosity of 125 to 250 centipoises available as EHEC-High from Hercules and ethylcellulose having a specific viscosity of 1.23 and specific other cellulosic polymers described in the aforementioned Organic Coating Technology on pages 402–478 which is incorporated herein by reference.

Specific alkyd resins include those listed on page 295 of the aforementioned Organic Coating Technology.

Specific examples of rubber resins include a natural rubber containing 67% chlorine and commerically available under the trademark Parlon from E. I. du Pont de Nemours and Co., Inc.; and 85% styrene-butadiene copolymer available as Pliolite S–5 resin, and other specific examples described in the aforementioned Organic Coating Technology on pages 351 to 377 which is incorporated herein by reference. Resins in the convertible class include varnish resins, certain alkyd resins and certain amino resins. Examples of classes of varnish resins include the phenolic resins and other classes including specific examples described in the aformentioned Organic Coating Technology on pages 132–190 which is incorporated herein by reference. Examples of alkyd resins include the polyester resins, styrenated alkyds and other classes including specific examples described in the aforementioned Organic Coating Technology on pages 269–325 which is incorporated herein by reference. Examples of classes of amino resins include urea-formaldehyde resins and melamine resins. Specific examples are given in the aforementioned Organic Coating Technology, on pages 326–350 which is incorporated herein by reference.

The organic solvents which are used to dissolve the resins are well known to those in the coating composition art and can be selected from the aliphatic solvents such as the $C_5$ to $C_8$ alkanes such as pentane, isopentane, isohexane, octane and the like; the petroleum spirits such as naphtha, mineral spirits, kerosene and the like; the lower aliphatic alcohols such as ethyl alcohol, isopropyl alcohol and the like and the aromatic solvents such as toluene, xylene, benzene and the like and the hydroxyl substituted aromatics such as toluol, xylol and the like. These solvents are employed in the amounts required to give the desired viscosity for the particular application method that is generally from about 10% to about 80% of the total composition.

Carbonifics are employed in amounts to provide from about 10 to about 50%, preferably from about 20 to about 40%, based on the total weight of solids. These materials can be either admixtures or preformed products of resinous carbonifics such as urea and a source of formaldehyde such as paraformaldehyde, or urea-formaldehyde resins or melamine-formaldehyde resins. In addition, non-resinous carbonifics can be used solely or in conjunction with the resinous carbonifics and which include carbohydrated, modified starches, and similar substances, a water-dispersible protein and a gelatin or casein or a polyhydric compound such as hexitols (mannitol), pentitols (arabitol), monopentaerythritol, the poly-pentaerythritols, that is, polymeric forms, for example, as a dimer, trimer and the like, such as dipentaerythritol and tripentaerythritol and mixtures thereof, and solid chlorinated paraffin materials containing from about 30% to about 80% by weight of chlorine. In addition, improved results can oftentimes be obtained by adding to the non-resinous carbonific an amine compound such as dicyandiamide, urea, melamine, dimethyl urea, glycine and the like with dicyandiamide and melamine being preferred. Usually amounts of such amine compounds of from about 5% to about 75% based on the total weight of carbonific solids are preferred. It is possible to use a mixture of two or more of the above-mentioned compounds. Those carbonific materials which evolve non-flammable gases upon the exposure to heat are termed "blowing agents." These materials are generally required to achieve intumescence. Thus it is preferred that the carbonific component contain at least some of the materials which not only tend to act to produce a carbon-yielding substance but also tends to produce a foam by their evolution of non-flammable gases.

The phosphate containing materials useful in the present invention include the water-soluble lower ammonium phosphates such as monoammonium orthophosphate, diammonium orthophosphate, mono-, di-, tri- and tetra-ammonium pyrophosphates, the ammonium tripolyphosphate and the like and the substantially water-insoluble ammonium polyphosphates, i.e., those compounds having P—O—P linkages, and having the general formula

$$H_{(n-m)+2}(NH_4)_m P_n O_{3n+1}$$

wherein $n$ is an integer having an average value greater than 10 and $m/n$ has an average value between about .7 and about 1.1 and $m$ has a maximum value equal to $n+2$. The average value of $n$ being greater than 10 is evidenced by the paper chromatography method [Karl-Kroupa, Anal. Chem. 28, 1091 (1956)], and the polymeric P—O—P type linkage is evidenced by N.M.R. spectra which indicates substantially no P—N—P type linkages and no ortho, pyro or short chain P—O—P type groups and by infra-red spectra which indicates P—O—P type linkages but does not indicate substantially any P—N type linkages.

The polymeric polyphosphates can be either straight chain structures or branched chain structures. It should be noted that substantially all of the nitrogen in these polyphosphates is present as the ammoniacal nitrogen and there is substantially no nuclear nitrogen present in the polyphosphates. Although theoretically the ammoniacal nitrogen to phosphorus molar ratio for the polyphosphates of the instant invention is about 1, when the polyphosphates are completely ammoniated and the chain length is relatively long, in some cases the molar ratio of ammoniacal nitrogen to phosphorus is less than 1 and it is intended that this invention pertain to those polymeric ammonium polyphosphates having a molar ratio of not less than about 0.8. In addition, when the polyphosphates useful in this invention are characterized herein as being substantially water-insoluble, it is intended to mean that the solubility of a slurry of 10 grams of solids/100 cc. of water for 60 minutes at 25° C. is about 5 grams/100 cc. of water or less. Specifically, as used herein, an ammonium polyphosphate having a solubility of a specified value refers to the solubility value in grams per 100 cc. of water when 10 grams of said polyphosphate are slurried in 100 cc. of water for 60 minutes at 25° C.

The degree of polymerization of the substantially water-insoluble ammonium polyphosphate is difficult to determine since known methods for determining such are "so-called" solution methods, that is, they employ solution techniques for polymerization measurements. For example, as determined by the end group titration method [Van Wazer, Griffith and McCullough, Anal. Chem. 26, 1755 (1954)] after converting the ammonium polyphosphate to the acid form by ion exchange resins [Van Wazer and Holst, J. Am. Chem. Soc., 72, 639 (1950)], the average numerical value of $n$ is from about 20 to about 400, preferred from about 40 to about 400; whereas, as determined by the method of light scattering or viscosity correlations obtained from light scattering [Strauss and Wineman, J. Am. Chem. Soc., 80, 2366 (1958)] modified by use of the Zimm plot method [Stacey, "Light-Scattering in Physical Chemistry," Butterworths, London (1956)] the weight average value of $n$ is above about 500 and preferred from about 500 to about 100,000 with from about 1,000 to about 30,000 being especially preferred.

The term "ammoniacal nitrogen" refers to that nitrogen which is present in the form of ammonium ions and is capable of being removed by the hydrogen form of a strong cation exchange resin, i.e. the hydrogen form of a sulfonate polystyrene resin. The term "non-ammoniacal nitrogen" or "nuclear nitrogen" refers to nitrogen incapable of being removed in the manner of true ammonium nitrogen.

The ammonium polyphosphates can be prepared exhibiting many different crystalline forms as evidenced by their X-ray diffraction patterns and, in general, any of such forms can be used (although Forms 1 and 2, infra, are preferred) as well as any non-crystalline or amorphous forms. Crystalline forms illustrative of some of the ammonium polyphosphates suitable for use include the following:

X-RAY DIFFRACTION DATA [a]

| Line [b] | Form 1, d, A. | Form 2, d, A. | Form 3, d, A. | Form 4, d, A. |
|---|---|---|---|---|
| 1 | 6.06 | 5.70 | 6.65 | 5.70 |
| 2 | 5.47 | 6.06 | 5.68 | 5.60 |
| 3 | 3.83 | 3.08 | 5.40 | 3.42 |
| 4 | 3.50 | 2.93 | 3.52 | 7.00 |
| 5 | 3.24 | 3.37 | 3.80 | 6.10 |

[a] CuK α radiation.
[b] Five strongest lines in order to decreasing intensity.

Of these various forms of ammonium polyphosphate, Form 1 is preferred.

In general, the ammonium polyphosphates can be used in any size which permits their admixture with the other components of the intumescent coating composition into a homogeneous mixture. In particular, ammonium polyphosphates having a particle size fine enough to pass through a 40 mesh screen (USSS) are preferred.

The substantially water-insoluble ammonium polyphosphates of the present invention can be prepared by many and various methods such as the methods disclosed and described in copending application Ser. No. 420,459, filed Dec. 22, 1964, now United States Pat. 3,397,035 granted Aug. 13, 1968 which is also assigned to the assignee of this application. In general, a phosphate-containing material, such as monoammonium orthophosphate, diammonium orthophosphate, condensed phosphoric acid, orthophosphoric acid and the like, is thermally condensed with an ammoniating and condensing agent such as urea, ammonium carbonate, biuret, sulfamide, sulfamic acid, ammonium sulfamate, guanyl urea, methyl urea, formamide, amino urea, 1-3-diamino urea, biurea and the like. In particular, for example, monoammonium orthophosphate can be thermally condensed by urea to prepare substantially water-insoluble ammonium polyphosphates by heat treating a melt formed from substantially equimolar quantities at a temperature of about 250° C. for a period of about 3 hours.

Although any of the ammonium phosphates can be used in the practice of this invention, the ammonium polyphosphates are preferred. In general, the ammonium phosphates can be employed in the intumescent coating compositions in amounts to provide from about 1% to about 60% based on the total solids in the composition with amounts of from about 20% to about 50% by weight being preferred.

Any natural occurring mineral which can be milled into fibers is generically known as asbestos. Different types of asbestos can be quite distinct mineralogically. For example, the following table gives the empirical formula for several different types of asbestos:

| Formula: | Name |
|---|---|
| $Mg_6SiO_{11}(OH)_6$ | Chrysotile |
| $(MgFe)_7Si_8O_{22}(OH)_2$ | Anthophyllite |
| $Ca_2Mg_5Si_8O_{22}(OH)_2$ | Tremolite |
| $Ca_2(Mg,Fe)_5Si_8O_{22}(OH)_2$ | Actinolite |
| $(FeMg)SiO_3 \cdot 2-5\% \; H_2O$ | Amosite |
| $(Na_2O) \cdot Fe_2O_3 \cdot 3Fe_8SiO_2 \cdot H_2O$ | Crocidolite |

All of these fibers have been found to be useful, however, the coating compositions containing Amosite or Crocidolite asbestos are more effective in protecting structural steel in this application than fibers derived from the other mineralogical forms of asbestos listed above.

The fiber lengths generally employed are below about 6 inches and preferably are even shorter, that is, below about 1 inch, particularly when a relatively smooth coating is desired. The particular length of the fiber chosen will depend upon the particular use for the coating composition, that is, whether or not a smooth coating is desired from an appearance standpoint. The asbestos fibers are used in amounts of from about 0.5% to about 20% of the total solids present in said composition with from about 3% to about 15% being preferred.

The diatomaceous earth which has been found to be suitable is flux calcinated and has a larger particle than that which is produced without the fluxing agent. The particle size distribution of the diatomaceous earth which has been found to be suitable is as follows:

| Particle size (microns): | Percent smaller |
|---|---|
| 40 | 78 |
| 30 | 48 |
| 20 | 25 |
| 10 | 5 |

The approximate chemical analysis of the suitable diatomaceous earth is:

| | Percent by weight |
|---|---|
| $SiO_2$ | 88–91 |
| $Al_2O_3$ | 3–4 |
| $Fe_2O_3$ | 1.1–1.5 |
| $P_2O_5$ | 0.1–0.2 |
| $TiO_2$ | 0.1–0.2 |
| $CaO$ | 0.3–0.6 |
| $MgO$ | 0.4–1.0 |
| $NaO+K_2O$ | 3.0–3.6 |

It is believed surprising that the diatomaceous earth provides a pronounced improvement to the coating composition, especially since other diatomaceous earths with the same chemical compositions do not achieve such an improvement. For example, a coating composition containing a substantially chemically identical diatomaceous earth, however, having larger particles, that is 25% retained on a 150 mesh U.S. Standard Sieve Series, does not increase the ratings by a substantial amount over the ratings of the same composition but without diatomaceous earth. Additionally, coating compositions which incorporate a diatomaceous earth having the following particle size distribution do not have increased ratings when used in similar amounts as the diatomaceous earth used in the practice of this invention.

| Particle size: | Percent by weight |
|---|---|
| Over 40 microns | 0 |
| 20–40 | 2.5 |
| 10–20 | 5.0 |
| 6–10 | 7.5 |
| 3–6 | 30.0 |
| Less than 3 microns | 55.0 |

The suitable materials, therefore, are diatomaceous earths having at least 75% of the particles smaller than 40 microns and less than 75% of the particles smaller than 10 microns. It is further preferred that at least 50% of the particles are larger than 10 microns. It is also believed surprising that such a large improvement in ratings can be achieved with relatively low levels of the particular diatomaceous earth, that is, it is only necessary to incorporate from about 1% to about 6% by weight based upon the total weight of solids with from about 1.5% to about 5% being preferred. The diatomaceous earth of this invention significantly increases the degree of protection.

To more fully illustrate the invention, the following non-limiting examples are presented, all parts, percentages and proportions being by weight unless otherwise indicated.

EXAMPLE 1

Two coating compositions were prepared utilizing the components as given in Table I. Steel beams were coated with 3/16" coating and tested in accordance with the conditions of ASTM E-119 with the results as given in Table I.

TABLE I

|  | Parts by weight | |
|---|---|---|
|  | 1 | 2 |
| Thermoplastic acrylic polymer [1] (45% solution in toluene) | 22.7 | 22.7 |
| Ammonium polyphosphate | 25.0 | 25.0 |
| Melamine | 7.7 | 6.5 |
| Dipentaerythritol | 7.1 | 7.1 |
| Chlorinated paraffin (70% chlorine) | 4.8 | 4.0 |
| Amosite asbestos fibers | 4.8 | 4.8 |
| Toluene | 27.9 | 27.9 |
| Diatomaceous earth | -- | 2.0 |
| Rating, min. (3/16" coating) | 56 | 92 |

[1] Acryloid B-48N, copolymer of acrylic ester and methacrylic ester, a 45% solution in toluene having a viscosity at 20° C. of 6,000 to 10,000 centipoises.

It is to be noted that sample 1 did not contain diatomaceous earth while sample 2 contained about 2% diatomaceous earth. It is to be noted that the coating composition without diatomaceous earth had a rating of below one hour whereas the one containing diatomaceous earth had a rating of well above one hour when tested under conditions substantially the same as ASTM E-119. The foregoing indicates that the diatomaceous earth imparts an unexpected beneficial effect when incorporated in coating compositions containing a resin dissolved in an organic solvent. Substantially similar results are obtained when other formulations with other resins are substituted for the thermoplastic acrylic polymer in the above formulation.

EXAMPLE 2

The coating compositions of Table II below are prepared by preparing a uniform dispersion of the solid materials in the organic solvent vehicle.

The foregoing compositions when tested in accordance with the conditions of ASTM E-119 yield ratings in excess of 1 hour at 3/16" thickness. When the coating compositions are applied in multilayers with a drying time between layers an increase in protection is achieved. For example, a 3/16" single layer has a rating of 94 minutes, using three layers of 3/16" each a rating of 134 minutes is achieved when formulations similar to those listed above are used. Ratings of above two hours are particularly useful in areas where there is a high risk of fire.

Other ingredients can be added such as pigments, dyes, inert fillers and the like as desired. When used, these other ingredients will generally be used in amounts of less than about 10% of the total solids. Additionally, the solvent used will vary depending upon the particular ingredients used and the particular viscosity desired. In each instance the binders, diatomaceous earth, the carbonific, the ammonium phosphates and the asbestos will comprise from about 20% to about 90% of the total weight of the coating composition.

The foregoing examples and methods have been described in the foregoing specification for the purpose of illustration and not limitation. Many other modifications and ramifications will naturally suggest themselves to those skilled in the art based on this disclosure. These are intended to be comprehended as within the scope of this invention.

TABLE II

| Ingredient | Parts by weight | | | | | | |
|---|---|---|---|---|---|---|---|
|  | A | B | C | D | E | F | G |
| Vinyl toluene/butadiene copolymer [1] | 8 |  |  |  | 4 |  |  |
| Ethyl hydroxy ethyl cellulose [2] |  | 8 |  |  | 4 |  |  |
| Coconut oil modified non-oxidizing alkyd [3] |  |  | 14.4 |  |  | 12 |  |
| Ethyl cellulose polymer [4] |  |  |  | 10 |  |  |  |
| Acrylic ester [5] |  |  |  |  |  |  | 15.3 |
| Mineral spirits | 41 | 40 |  |  | 46 | 38 |  |
| Toluene |  |  | 50 | 40 |  |  | 35.3 |
| Pentane |  |  |  | 5 |  |  |  |
| Xylene |  |  |  | 5 |  |  |  |
| Asbestos | 5 | 4 | 5 |  | 4.8 | 6 | 4.8 |
| Ammonium polyphosphate [1] | 24 | 21 |  | 16 | 20 | 10 | 25 |
| Monoammonium orthophosphate |  |  | 9 | 3 |  | 7 |  |
| Diammonium pyrophosphate |  |  | 9 | 4 |  | 10 |  |
| Melamine | 8 | 7.5 | 7 | 6 | 8 | 5 | 6.5 |
| Dipentaerythritol | 7 | 6.5 | 6 | 4 | 7 | 6 | 7.1 |
| Chlorinated paraffin (70% chlorine) | 5 | 4.3 | 4 | 4 | 5 | 4 | 4.0 |
| Diatomaceous earth | 2 | 2.3 | 2 | 3 | 1.2 | 2 | 2.0 |
| Form 1 ammonium polyphosphate [1] |  |  |  |  |  |  |  |

[1] Pliolite VT.
[2] EHEC-High (Hercules).
[3] PR—427 resin (trademark of Allied Chemical Corporation).
[4] Ethyl cellulose T type (Hercules).
[5] Acryloid® B-48N.

EXAMPLE III

The procedure of Example II, composition A, is repeated except Pliolite VT-L is substituted for Pliolite VT.

EXAMPLE IV

The procedure of Example III is repeated except Pliolite VTAC and VTAC-L is substituted for Pliolite VT.

EXAMPLE V

The procedure of Example III is repeated except polyvinyl chloride, available as Geon 121, is substituted for Pliolite VT.

What is claimed is:

1. In an improved fire-retardant intumescent coating composition for metallic substrates comprising an organic solvent dispersion of
   (A) a resin selected from the group consisting of vinyl resins, acrylic ester resins, rubber resins, amino resins, alkyd resins and varnish resins, in an amount from about 10% to about 50% of the solids based on the total weight of the solids present in said composition,
   (B) a carbonific selected from the group consisting of urea-formaldehyde resins, melamine-formaldehyde resins, dipentaerythritol, tripentaerythritol, chlorinated paraffin compounds containing 30 to 80% by weight chlorine and mixtures thereof in an amount from about 1% to about 40% based on the total weight of solids present in said composition,
   (C) an ammonium polyphosphate of the formula

$$H_{(n-m)+2}(NH_4)_m P_n O_{3n+1}$$

wherein $n$ has an average value greater than 10, $m/n$ has an average value between about 0.7 and 1.1 and the maximum value of $m$ is equal to $n+2$ and in an amount from about 1% to about 60% based on the total weight of solids present in said composition, and
   (D) asbestos fibers selected from the group consisting of amosite, crocidolite and mixtures thereof and in an amount from about 0.5% to about 20% based on the total weight of solids present in said composition, the improvement comprising the incorporation of
   (E) calcined diatomaceous earth having at least 75% of the particles smaller than 40 microns and less than 75% of the particles smaller than 10 microns and in an amount to provide from about 1% to about 6% of the total weight of solids in said composition, the foregoing components A, B, C, D and E comprising from about 20% to about 90% by weight of said coating composition, there being less than 10% by weight of the total solids consisting of pigments, dyes and inert fillers and said organic solvent is selected from the group consisting of alkanes containing 5 to 8 carbon atoms, petroleum spirits, lower aliphatic alcohols, aromatic solvents containing one phenyl ring and hydroxyl substituted aromatic solvents containing one phenyl ring.

2. The composition of claim 1 wherein said carbonifics are in amounts to provide from about 20% to about 40% by weight based on the total weight of solids, and said ammonium phosphates are in amounts to provide from about 30% to about 50% by weight based on the total weight of solids, said asbestos is in amounts to provide from about 5% to about 15% by weight based on the total weight of solids and said diatomaceous earth is in amounts to provide from about 1.5% to about 5% based on the total weight of solids.

3. A composition according to claim 2 wherein said resin is a vinyl resin.

4. A composition according to claim 2 wherein said resin is an acrylic ester resin.

References Cited
UNITED STATES PATENTS

| | | | |
|---|---|---|---|
| 2,385,500 | 9/1945 | Fasolo | 106—15 FP |
| 2,917,476 | 12/1959 | Peterson et al. | 117—137 X |
| 2,956,037 | 10/1960 | Venable | 117—137 X |
| 3,027,272 | 3/1962 | Ratzel | 117—137 X |
| 3,284,216 | 11/1966 | Kaplan | 117—137 X |
| 3,513,114 | 5/1970 | Hahn et al. | 106—15 FP |
| 3,562,197 | 2/1971 | Sears et al. | 106—15 FP |

LORENZO B. HAYES, Primary Examiner

U.S. Cl. X.R.

106—15 FP; 117—137; 260—33.4 R, 33.6 UA, 39 SB, 40 R, 41 A, 851